United States Patent [19]
Shibata et al.

[11] Patent Number: 6,058,037
[45] Date of Patent: May 2, 2000

[54] POWER CONVERSION DEVICE

[76] Inventors: Hisanori Shibata; Hiroshi Mochikawa, both of c/o Intellectual Property Division, Toshiba Corporation, 1-1-1, Shibaura, Minato-ku, Tokyo, Japan

[21] Appl. No.: 09/082,183

[22] Filed: May 20, 1998

[30] Foreign Application Priority Data

May 23, 1997 [JP] Japan ................................ 9-133587

[51] Int. Cl.$^7$ .......................... H02M 7/538; H01H 47/00
[52] U.S. Cl. ........................ 363/132; 363/135; 307/116
[58] Field of Search ................................ 363/132, 131, 363/135, 95, 97, 98, 40, 41

[56] References Cited

U.S. PATENT DOCUMENTS

| | | | |
|---|---|---|---|
| 4,107,551 | 8/1978 | Akamatsu | 307/257 J |
| 4,231,083 | 10/1980 | Matsuda et al. | 363/135 |
| 4,922,365 | 5/1990 | Mori | 361/18 |
| 5,450,306 | 9/1995 | Garces et al. | 363/41 |
| 5,517,402 | 5/1996 | Ikeda et al. | 363/132 |
| 5,952,738 | 9/1999 | Miller | 307/116 |

*Primary Examiner*—Peter S. Wong
*Assistant Examiner*—Rajnikant B. Patel
*Attorney, Agent, or Firm*—Limbach & Limbach, LLP

[57] ABSTRACT

Reflux diode $5u$~$5w$ and $5x$~$5z$ are in anti-parallel connected to MOSFET $4u$~$4w$ and $4x$~$4z$. When MOSFET $4u$~$4w$ and $4x$~$4z$ are turned OFF, an electric current flows in a forward direction to reflux diode $5u$~$5w$ and $5x$~$5z$. In the case of this construction, when for example reflux diode $5u$ disconnects, a small inverse voltage is applied from inverse voltage applied circuit 7 to reflux diode $5u$. For this reason, as the inverse recovery of reflux diode $5u$ is produced by low voltage direct current power source 8 of inverse voltage applied circuit 7, loss occurring at reflux diode $5u$ is reduced.

10 Claims, 17 Drawing Sheets

POWER CONVERSION DEVICE

BACKGROUND OF THE INVENTION

1. Field of the Invention

The present invention relates to a power conversion device, and more particularly to the main circuit switching components thereof being constructed so that the reflux diode is in anti-parallel connected.

2. Description of the Related Art

Conventionally, inverter devices, as shown in FIG. 1 are constructed so that reflux diode Du~Dw and Dx~Dz are connected anti-parallel to MOSFET Su~Sw and Sx~Sz. In the case of this construction, when MOSFET Su~Sw and Sx~Sz are turned off, the electrical current energy stored in load M circulates via reflux diode Du~Dw and Dx~Dz.

However, in the above mentioned conventional construction, if MOSFET Su is turned ON when forward flowing current Ia is flowing through reflux diode Dx, the voltage between PN (namely direct current link voltage) is added as inverse bias to both ends of reflux diode Dx, and as shown in FIG. 2, reflux diode Dx disconnects after the reverse current has flowed due to the residual charge in reflux diode Dx. Because of this, a large loss occurs in reflux diode Dx due to the voltage between PN and the reverse current, necessitating the enlargement of the radiator.

SUMMARY OF THE INVENTION

Accordingly, one object of the present invention is to provide a novel power conversion device which reduces the loss occurring in the reflux diode.

The above object of the present invention can be achieved by a power conversion device provided with the following structural requirements.

That is to say, a pair of main circuit switching components connected in series to a direct current voltage source and a reflux diode anti-parallel connected to each of these main circuit switching components, and an inverse voltage applied circuit which applies an inverse voltage smaller than the direct current voltage source to each of the reflux diodes when each of the reflux diodes disconnect.

According to the aforementioned means, when the reflux diode is disconnected, an inverse voltage smaller than the direct current voltage source is applied from the inverse voltage applied circuit to the reflux diode. As a result, as the low voltage source of the inverse voltage applied circuit produces an inverse recovery in the reflux diode, the loss occurring in the reflux diode is reduced.

Also, the above object of the present invention can be achieved by a power conversion device provided with the following structural requirements.

That is to say, an inverse voltage applied switching component with a lower voltage resistance than the main circuit switching component intervening on the power supply line of the inverse current applied circuit.

According to the aforementioned means, as the inverse voltage applied to the reflux diode is small, this can be sufficiently corresponded by a low voltage resistance inverse voltage applied switching component.

Furthermore, the above object of the present invention can be achieved by a power conversion device provided with the following structural requirements.

That is to say, the inverse voltage applied circuit applies an inverse voltage to the reflux diode during the dead time period of both main circuit switching components.

According to the aforementioned means, as an inverse voltage is applied to each reflux diode during the dead time period of both main circuit switching components, the occurrence of harmful effects by the inverse voltage to both main circuit switching components is prevented.

Furthermore, the above object of the present invention can also be achieved by a power conversion device provided with the following structural requirements.

That is to say, an electric potential detection means is provided to detect electric potential between the switching components of both main circuits, the selective application of an inverse voltage is carried out by the inverse voltage applied circuit in response to the detection results of the electric potential detection means.

According to the aforementioned means, in the case of phase electric current flowing through the main circuit switching component, whether or not the phase electric current is flowing through the reflux diode is determined based on the electric potential between both main circuit switching components, and an inverse voltage is applied when the phase current is flowing though the reflux diode. For this reason, the disconnection of the reflux diode can be accurately determined and an inverse voltage can be applied to the reflux diode with accurate timing.

Furthermore, the above object of the present invention can also be achieved by a power conversion device provided with the following structural requirements. That is to say, a drive power source of the main circuit switching component and voltage source of the inverse voltage applied circuit is shared.

According to the aforementioned means, as the main circuit switching component is driven by the voltage source of the inverse voltage applied circuit, it is not necessary to provide a dedicated drive power source for the main switching component.

Furthermore, the above object of the present invention can also be achieved by a power conversion device provided with the following structural requirements.

That is to say, an inverse voltage applied switching component intervenes on the electrical power line of the inverse voltage applied circuit, the drive power source of this inverse voltage applied switching component shares the drive power source of the main circuit switching component.

According to the aforementioned means, as the main circuit switching component and the inverse voltage applied switching component are driven by a shared drive power source, it is not necessary to provide a dedicated power source for both of the switching components.

Furthermore, the above object of the present invention can also be achieved by a power conversion device provided with the following structural requirements.

That is to say, an inverse voltage applied switching component intervenes on the electric power line of the inverse voltage applied circuit. The drive power source of this inverse voltage applied switching component is supplied by means of the charge pump method from the drive power source of the main circuit switching component.

According to the aforementioned means, as the drive power source of the inverse voltage applied switching component and the drive power source of the main circuit switching component are shared by means of the charge pump method, it is not necessary to provide a dedicated drive power source for both switching components.

Furthermore, the above object of the present invention can also be achieved by a power conversion device provided with the following structural requirements.

That is to say, the voltage source of one of the inverse voltage applied circuits is supplied by means of the charge pump method from the other voltage source of the inverse voltage applied circuit.

According to the aforementioned means, as one voltage source of the inverse voltage applied circuit and the other voltage source of the inverse applied circuit is shared by means of the charge pump method, it is not necessary to provide a dedicated voltage source for both of the inverse voltage applied circuits.

Furthermore, the above object of the present invention can also be achieved by a power conversion device provided with the following structural requirements.

That is to say, at least one of a resistor or a reactor intervenes on the power source line of the inverse voltage applied circuit.

According to the aforementioned means, as an even smaller inverse voltage is applied to the reflux diode due to at least one of a resistor or a reactor, loss occurring at the reflux diode during inverse recovery is further reduced.

Furthermore, the above object of the present invention can also be achieved by a power conversion device provided with the following structural requirements.

That is to say, a capacitor is connected in parallel to the main circuit switching component.

According to the aforementioned means, after the inverse recovery of the reflux diode has terminated, the capacitor is charged with the excess energy. Then, when the counterpart main circuit switching component is on, as the electric potential of the other main circuit switching component increases, "dV/dt" becomes smaller when switching.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
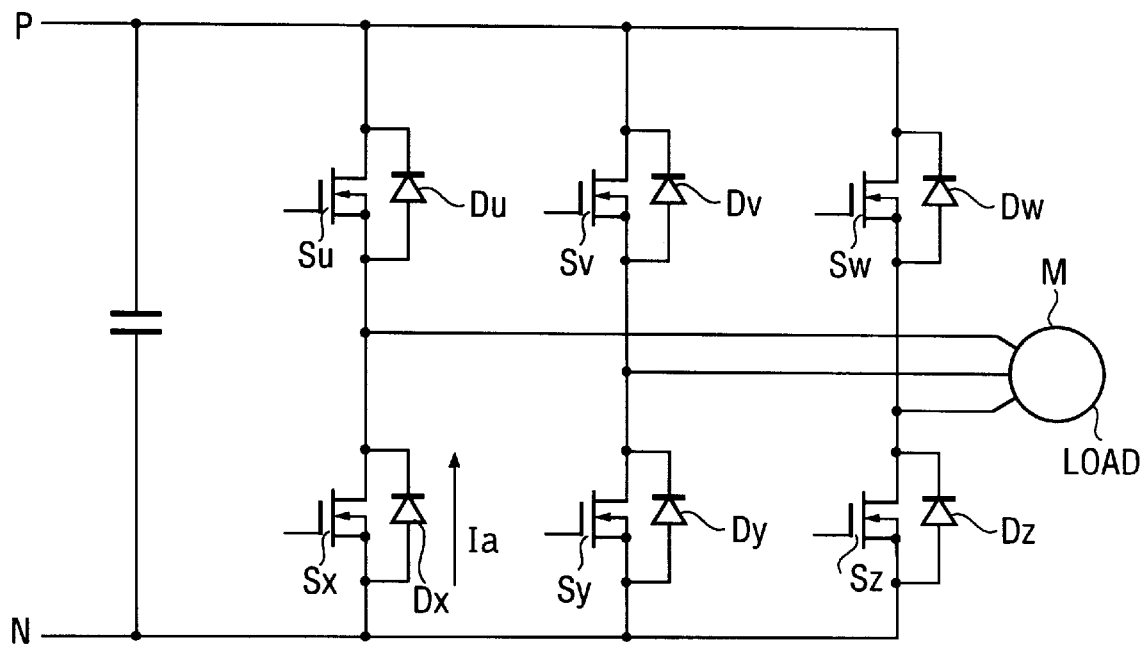
FIG. 1 is a diagram of the parts of a conventional power conversion device.
Figure 2:
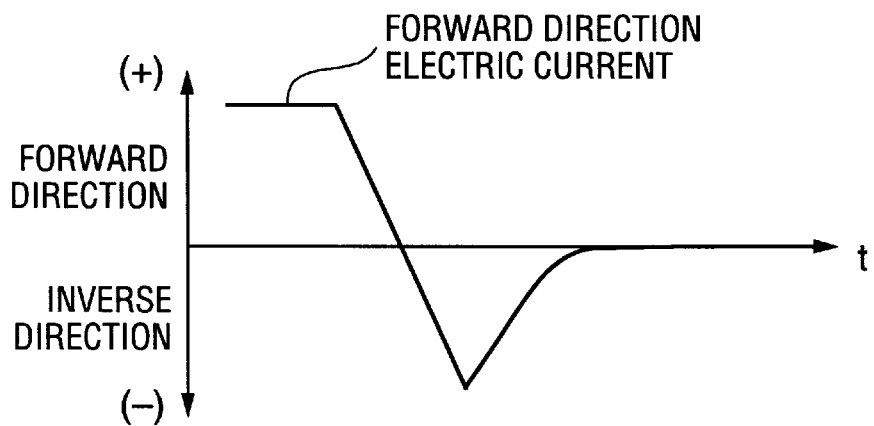
FIG. 2 is an illustration of the current wave characteristic of the inverse recovery of a reflux diode.
Figure 3:
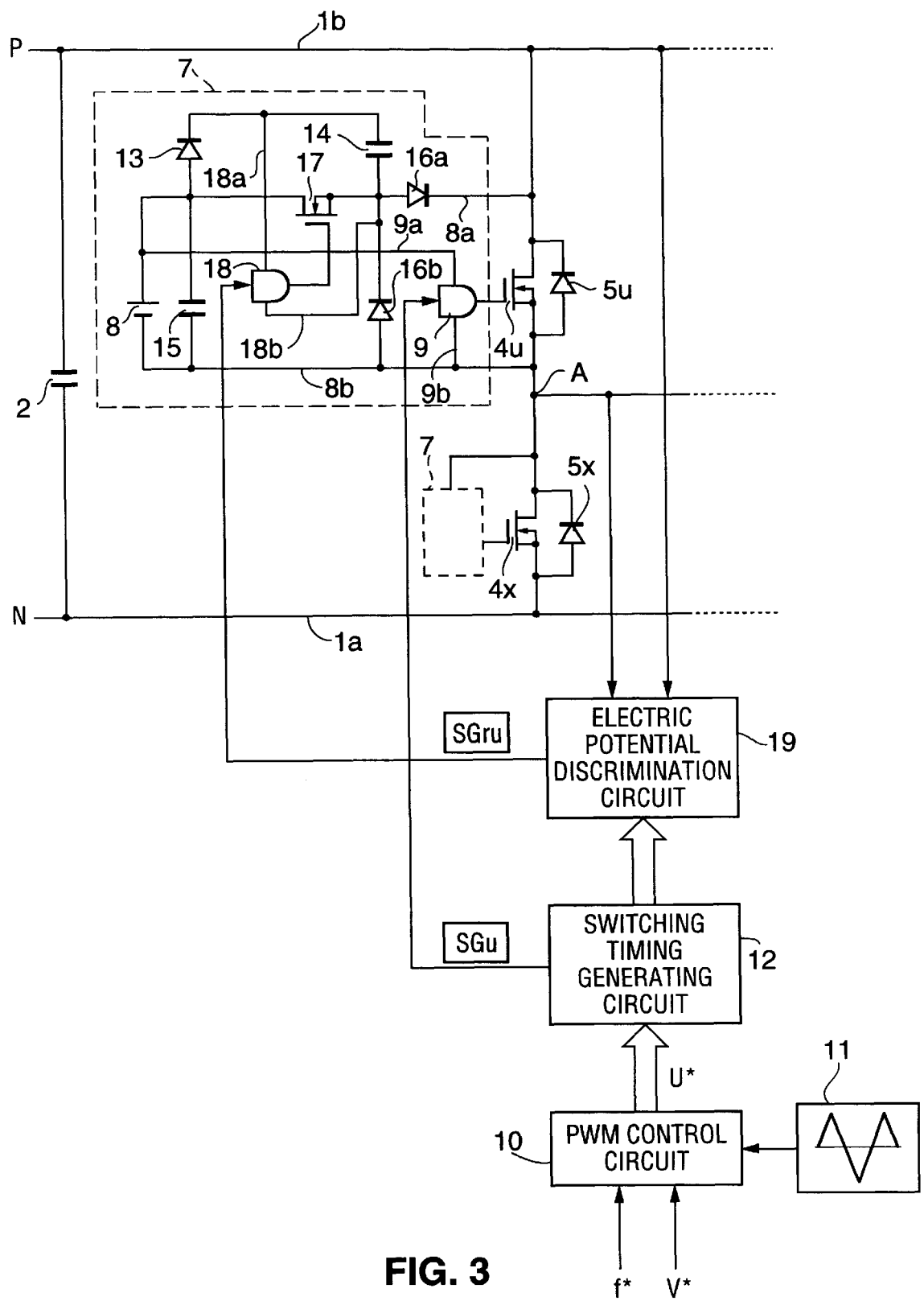
FIG. 3 is a diagram of a power conversion device in a first embodiment of the present invention (a diagram showing U phase circuit construction)

Referring now to the drawings, wherein like reference numerals designate identical or corresponding parts throughout the several views, and more particularly to FIGS. 3–10 thereof, one embodiment of the present invention will be described. FIG. 3 is a block diagram of the first embodiment of the present invention. FIG. 4~FIG. 10 are related diagrams of the first embodiment.

Furthermore, the embodiments of the present invention are applied to an inverter device.

Figure 5:
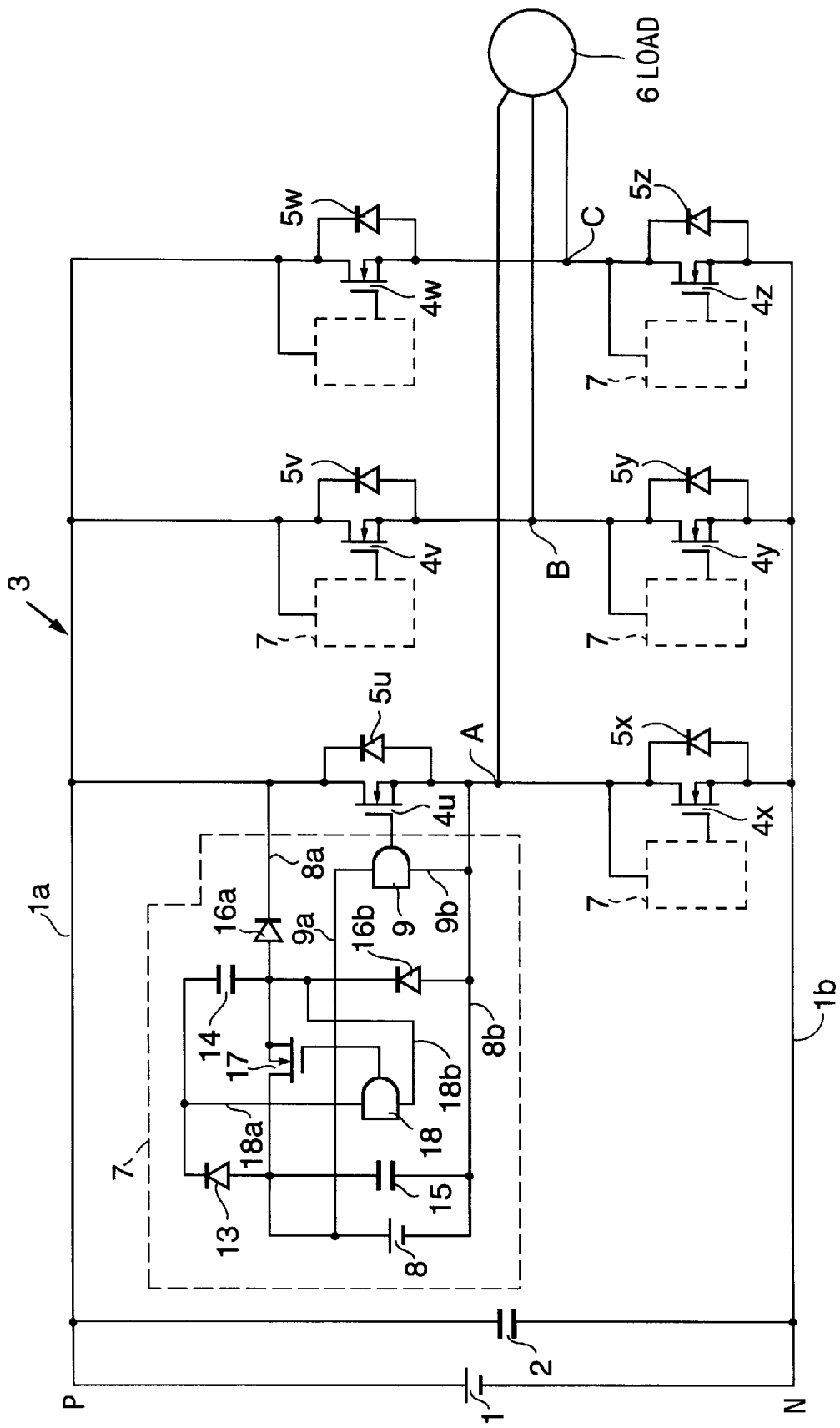
FIG. 5 is a diagram showing the overall circuit construction.
Figure 6:
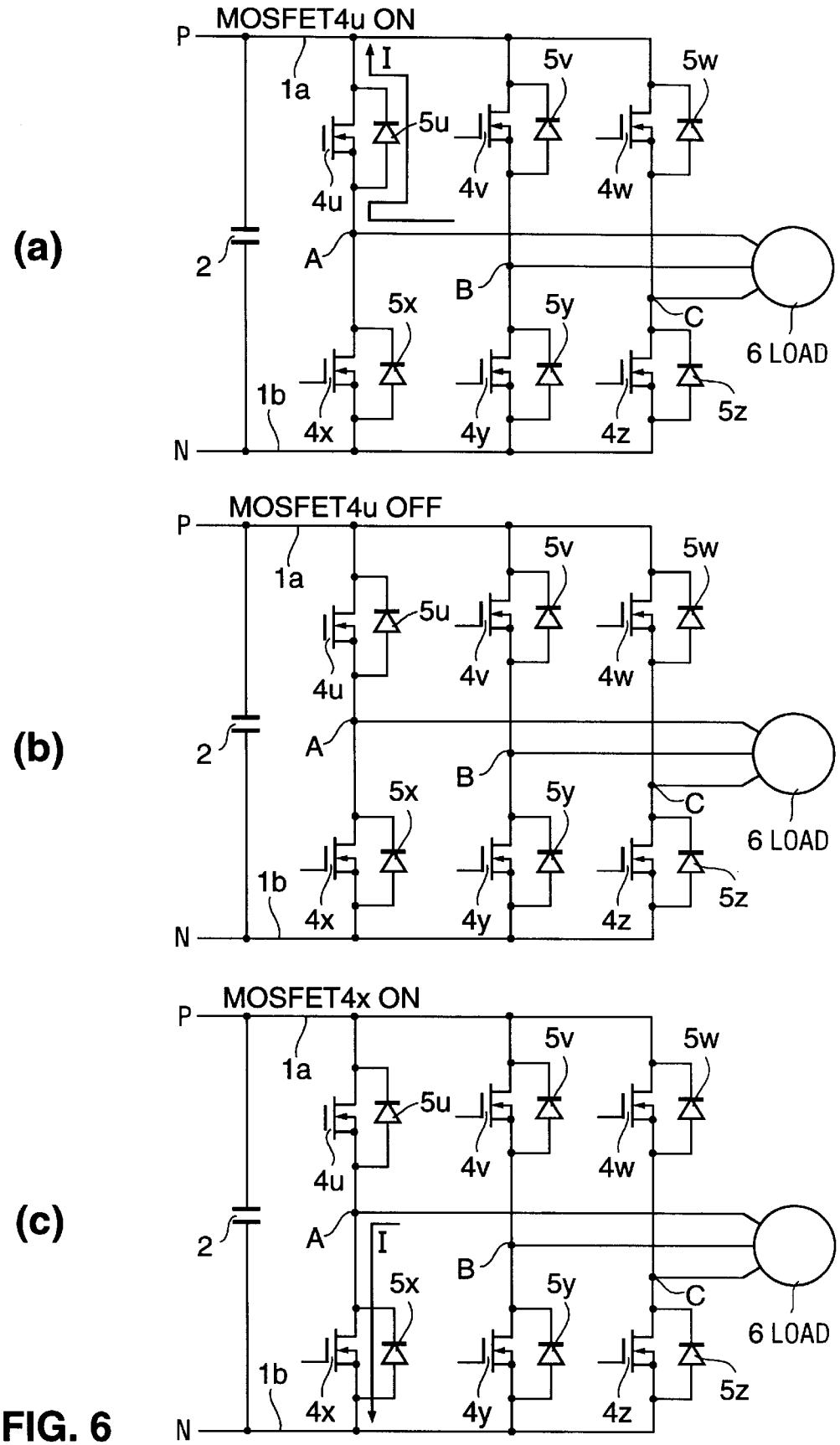
FIG. 6 is a diagram showing inverse voltage applied timing regarding a U phase reflux diode.

Firstly, in FIG. 5, direct current voltage source 1 rectifies 3 phase alternating current power source, and smoothing capacitor 2, inverter main circuit 3 are connected between power source lines 1a and 1b of direct current voltage source 1.

This inverter main circuit 3 consists of MOSFET 4u~4w and 4x~4z connected by a 3 phase bridge corresponding to the main circuit switching component, and reflux diode 5u~5w and 5x~5z is connected anti-parallel between collector C and emitter E of MOSFET 4u~4w and 4x~4z. Load 6 (For example a motor) is connected to the output side of inverter main circuit 3.

Figure 4:
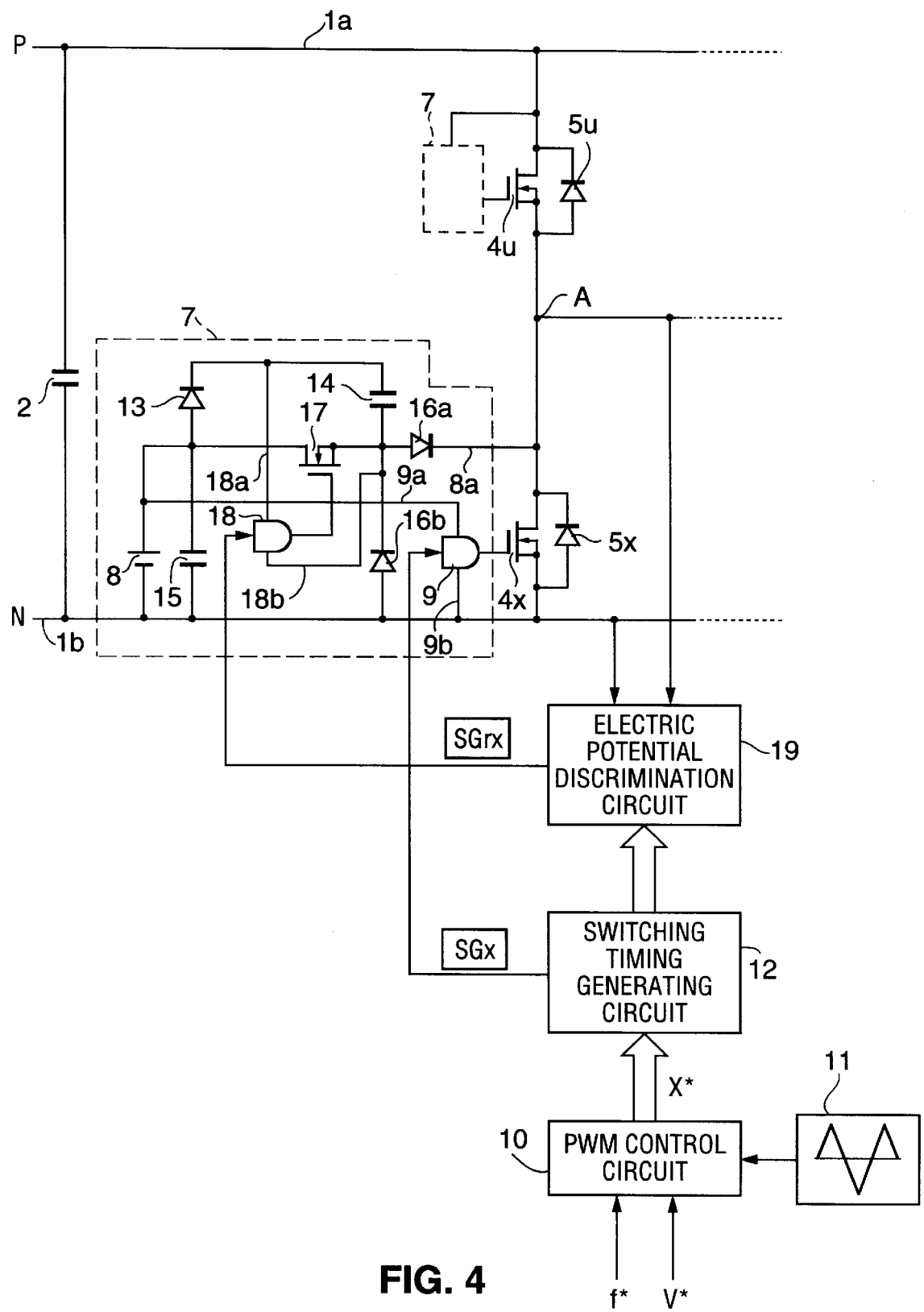
FIG. 4 is a diagram showing X phase circuit construction.

Each Inverse voltage applied circuit 7 is connected to reflux diode 5u~5w and 5x~5z. Each of these inverse voltage applied circuit 7 contains low voltage direct current voltage source 8 provided with a lower voltage value than direct current voltage source 1, and power source line 8a and 8b of low voltage direct current voltage source 8 are each connected between collector C and emitter E of MOSFET 4u~4w and 4x~4z. Moreover, as shown in FIG. 4, one power source line of X phase~Z phase inverse voltage applied circuit 7 shares power source line 1b of direct current voltage source 1.

Each inverse voltage applied circuit 7 contains base drive circuit 9. Power source line 9a and 9b of each of the base drive circuits 9 are respectively connected to power source line 8a and 8b of low voltage direct current voltage source 8. When drive signal SGu~SGw and SGx~SGz is output from switching timing generating circuit 12 to base drive circuit 9, base drive circuit 9 is activated by the power source from low voltage direct current voltage source 8, and MOSFET 4u~4w and 4x~4z turn on.

P.W.M. (Pulse Width Modulation) control circuit 10, by comparing the pyramidal wave provided by pyramidal wave emitting circuit 11 with the reference level based on frequency reference f* and voltage reference V* sets the PWM signal, and the PWM signal output from PWM control circuit 10 is supplied to switching timing generating circuit 12.

This switching timing generating circuit 12 sets the aforementioned drive signal SGu~SGw and SGx~SGz and by outputting to base drive circuit 9 controls the switching of MOSFET 4u~4w and 4x~4z and provides a drive power source to load 6. Drive signal SGu~SGw and SGx~SGz, as shown in ① and ② of FIG. 7, after setting reference signal U*~W* and X*~Z* based on the PWM signal from PWM control circuit 10, are set delayed by a few µ s to reference signal U*~W* and X*~Z* by delay circuit (not illustrated) contained in switching timing generating circuit 12.

Figure 7:
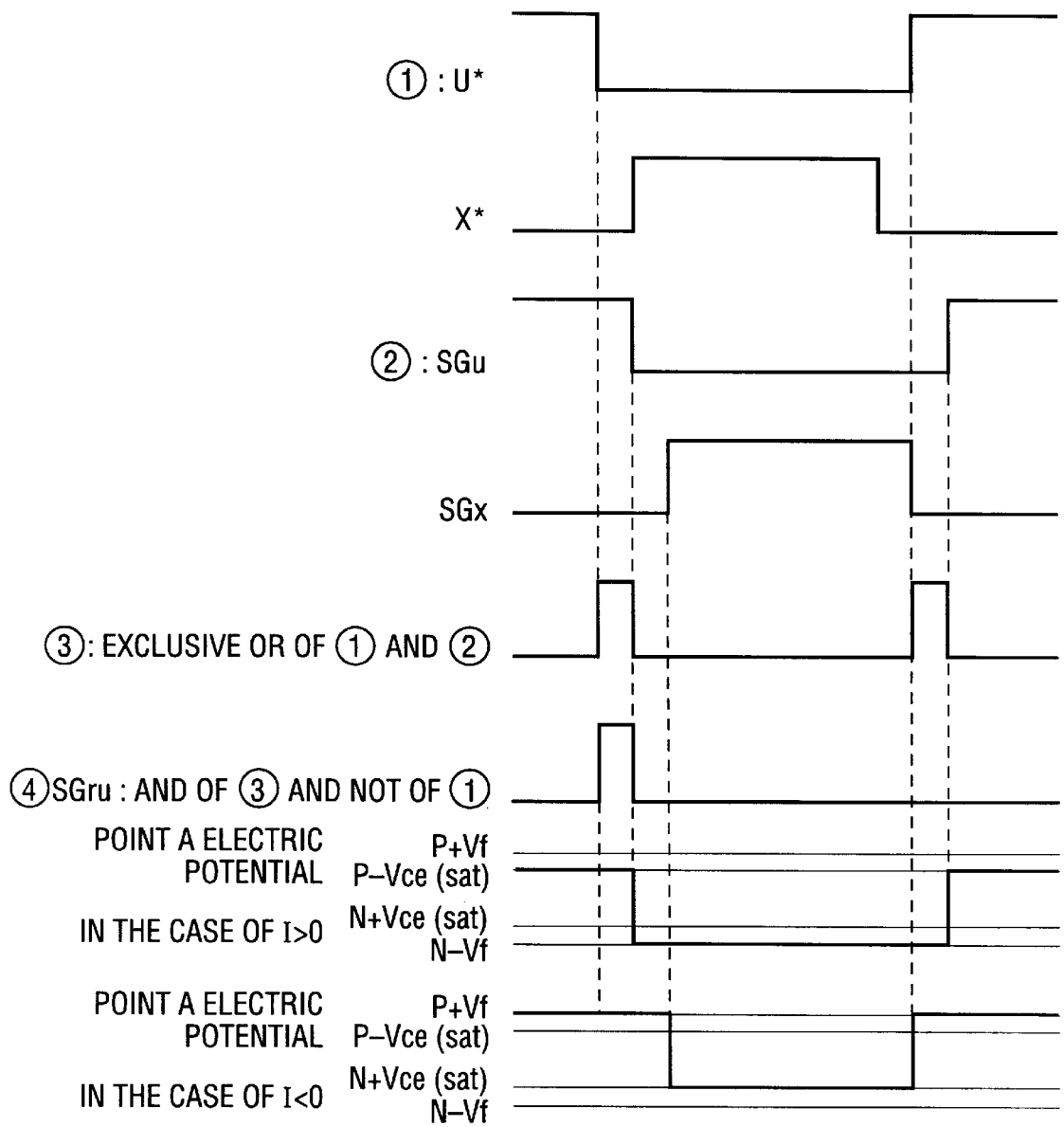
FIG. 7 is a U phase timing chart.
Figure 8:
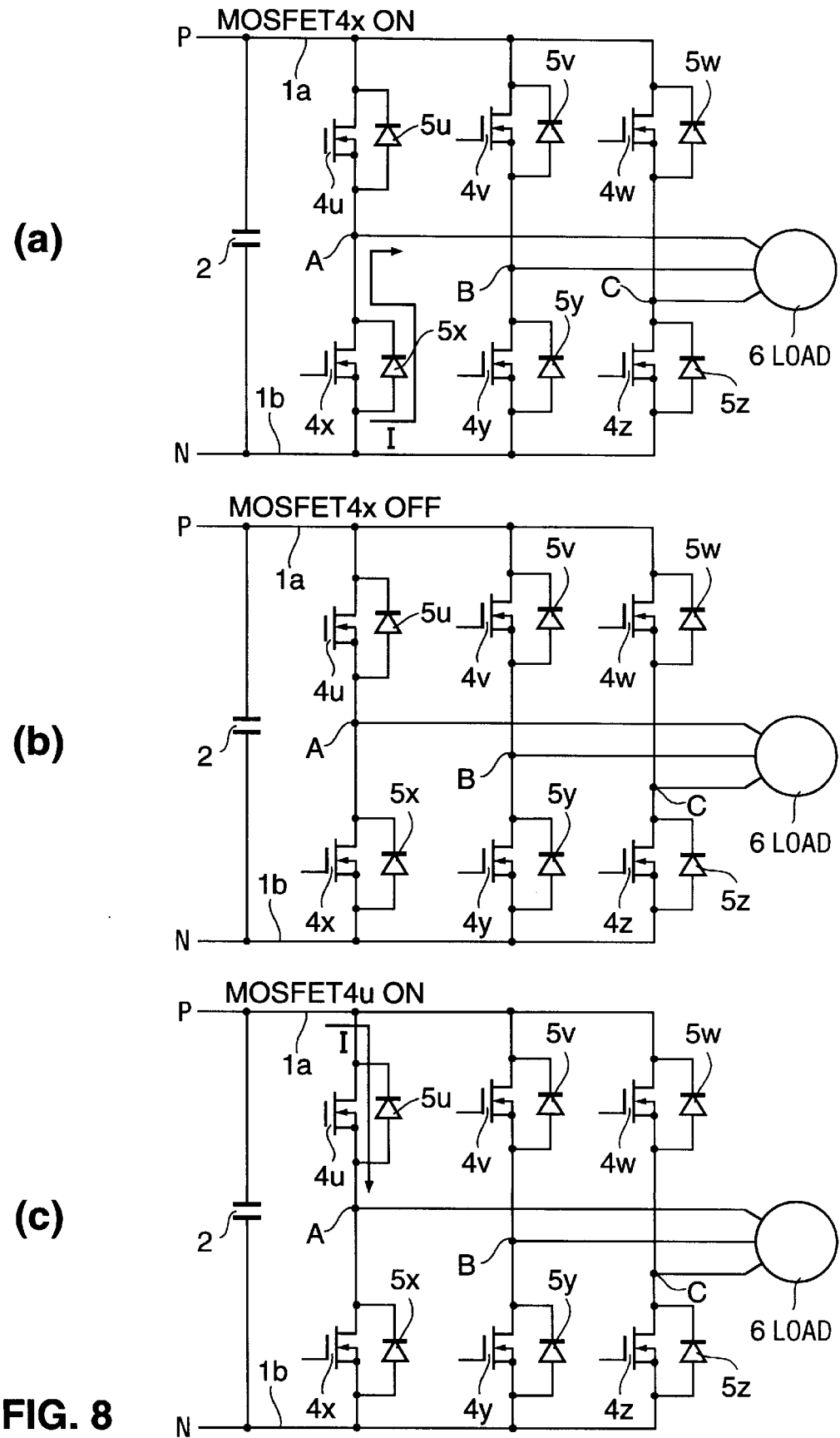
FIG. 8 is a diagram showing inverse voltage applied timing regarding an X phase reflux diode.

Moreover, in FIG. 7, only signal U* and SGu in terms of MOSFET 4u and signal X* and SGx in terms of MOSFET 4x are illustrated.

Each of inverse voltage applied circuit 7, as shown in FIG. 5, contains diode 13 and capacitor 14. Diode 13 and capacitor 14 are parallel connected to power source line 8a of low voltage direct current voltage source 8. When MOSFET 4u~4w and 4x~4z are on, the load is charged from each low voltage direct current voltage source 8 by capacitor 14 via diode 13.

Moreover, symbol 15 indicates a capacitor connected between power source line 8a and 8b (1b). Also, symbol 16a indicates a diode intervening on power source line 8a. Also, symbol 16b indicates a diode intervening between power source line 8a and 8b (1b).

Inverse voltage applied circuit 7 contains MOSFET 17 corresponding to the inverse voltage applied component. Each of these MOSFET 17 intervene on power source line 8a of low voltage direct current power source 8 selecting that with a lower voltage resistance than MOSFET 4u~4w and 4x~4z.

Each inverse voltage applied circuit 7 contains base drive circuit 18. The power source line 18a, 18b of each of these base drive circuits 18 are connected to both terminals of capacitor 14, and when drive signal SGru~SGrw and SGrx~SGrz is applied from electric potential discrimination circuit 19 (mentioned hereafter) to base drive 18, base drive 18 is activated by the charging power of capacitor 14. As a result, a smaller inverse voltage than direct current voltage source 1 is applied to reflux diode 5u~5w and 5x~5z from low voltage direct current voltage source 8 via MOSFET 17.

When reference signal U*~W* and X*~Z* is turned ON/OFF, switching timing generating circuit 12 of FIG. 3, calculates the Exclusive OR of reference signal U*~W* and X*~Z* and drive signal SGu~SGw and SGx~SGz. Next, by calculating the Exclusive OR calculation results and AND and NOT of reference signal U*~W*, drive signal SGru~SGrw and SGrx~SGrz are set to time immediately before MOSFET 4u~4w and 4x~4z turns off, and outputs to electric potential differential circuit 19.

Figure 9:
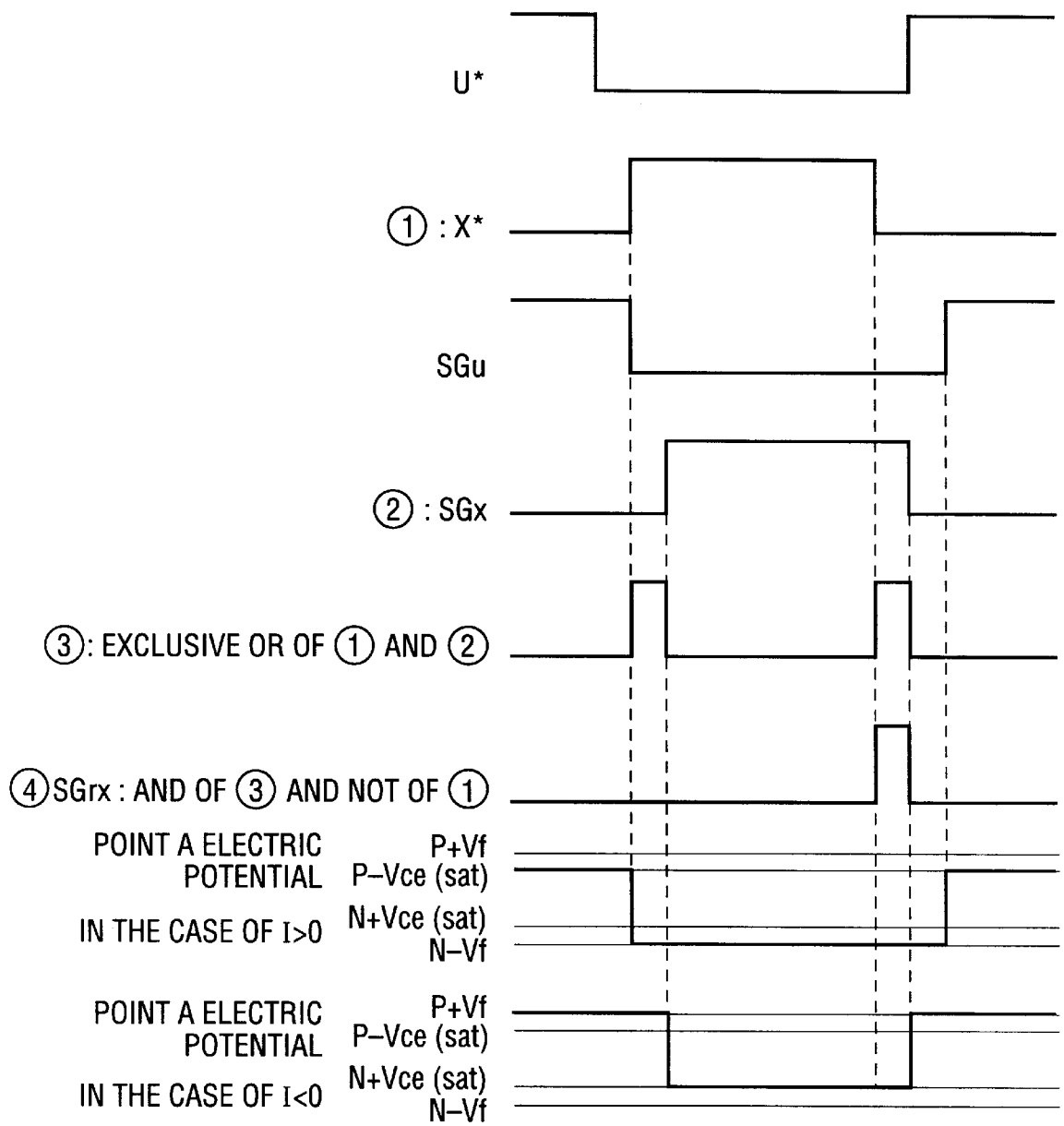
FIG. 9 is an X phase timing chart.

Moreover, ③ of FIG. 7 shows the Exclusive OR of reference signal U* and drive signal SGu. Also, ④ shows calculation results of the Exclusive OR and AND and NOT of reference signal U*. Also, ③ of FIG. 9 shows the Exclusive OR of reference signal X* and drive signal SGx, and ④ shows the calculation results of Exclusive OR and AND and NOT of reference signal X*.

Electric potential discrimination circuit 19 of FIG. 3 detects point A electric potential between MOSFET 4u and 4x (see FIG. 5), point B electric potential between MOSFET 4v and 4y (see FIG. 5), and point C electric potential between MOSFET 4w and 4z (see FIG. 5). Moreover point A electric potential, point B electric potential, and point C electric potential equal sometimes electric potential on point A, electric potential on point B and electric potential on point C respectively. In terms of base drive circuit 18, the output of drive signal SGru~SGrw and SGrx~SGrz is selectively performed corresponding to the electric potential detection results of point A~point C by the electric potential discrimination circuit 19. Moreover, electric potential discrimination circuit 19 corresponds to an electric potential detection means.

The following is an explanation of the operation of the above mentioned construction. MOSFET 4u~4w and 4x~4z is switching controlled by drive signal SGu~SGw and SGx~SGz, when the drive power source is being supplied to load 6, switching timing generating circuit 12 sets drive signal SGru~SGrw and SGrx~SGrz for base drive circuit 18 and outputs to electric potential discrimination circuit 19. At this time, electric potential discrimination circuit 19 compares point A~point C electric potential when reference signal U*~W* and X*~Z* from switching timing generating circuit 12 are off with the reference value, and as shown below, selectively outputs drive signal SGru~SGrw and SGrx~SGrz corresponding to the electric potential comparison.

<The application of inverse voltage in terms of U phase reflux diode.>

When reference signal U* is OFF, as shown in ② of FIG. 7, MOSFET 4u is turned ON by drive signal SGu. In this state, if the direction of the phase electrical current is "I>0(zero)", as shown in (c) of FIG. 8, as the electric current flows through MOSFET 4u, electric potential Va on point A becomes "ON voltage Vce (sat) of point P electric potential Vp–MOSFET 4u". In this case, electric potential discrimination circuit 19 compares point A electric potential detection results Va with point P electric potential Vp, and if "Va<Vp", decides that the direction of the phase electric current is "I>0" and does not output drive signal SGru.

When reference signal U* is OFF, as shown ② of FIG. 7, MOSFET 4u is turned on by drive signal SGu. In this state, if the direction of the phase electric circuit is "I<0", as shown in (a) of FIG. 6, as the electric current flows through reflux diode 5u, electric potential Va on point A becomes "Vp+Vf (ON voltage of reflux diode 5u)". In this case electric potential discrimination circuit 19 compares point A electric potential detection result Va A with point P electric potential Vp, and if "Va>Vp", decides that the direction of the phase electric current is "I<0" and outputs drive signal SGru to base drive circuit 18.

When drive signal SGru is output to base drive circuit 18 from electric potential discrimination circuit 19, base drive circuit 18 is activated by the charging power of capacitor 14 and MOSFET 17 changes to an ON state. Then, a small inverse voltage is applied to reflux diode 5u from low voltage direct current source 8, and as an inverse electric current is supplied to reflux diode 5u with timing as shown in (a) of FIG. 6 immediately before matching MOSFET 4x is turned ON, an inverse recovery of reflux diode 5u is produced by the low voltage direct current voltage source 8 of inverse voltage applied circuit 7. Moreover, as the applied operation of the inverse voltage in terms of V phase and W phase is identical to the aforementioned U phase, an explanation has been omitted.

<The application of inverse voltage in terms of X phase reflux diode>

When reference signal X* is OFF, as shown in ② of FIG. 9, MOSFET 4x is turned ON by drive signal SGx. In this state, if the direction of the phase current is "I<0", as shown in (c) of FIG. 6, as electric current flows through influx diode 4x, electric potential Vp on point A becomes "Vn (electric potential on point N)+Vce (sat)". In this case, electric potential discrimination circuit 19 compares electric potential Va on point A and electric potential Vn on point N, and if "Va>Vn", decides that the direction of the phase electric current is "I<0", and does not output drive signal SGrx.

When reference signal X* is OFF, as shown in ②of FIG. 9, MOSFET 4x is turned ON by drive signal SGx. In this state, if the direction of the phase current is "I>0", as shown in (a) of FIG. 8, as electric current flows through influx diode 5x, electric potential Va on point A becomes "Vn−Vf". In this case, electric potential discrimination circuit 19 compares electric potential Va on point A and electric potential Vn on point N, and if "Va<Vn", decides that the direction of the phase electric current is "I>0", and electric potential discrimination circuit 19 outputs drive signal SGrx to base drive circuit 18.

When drive signal SGrx is output to base drive circuit 18 from electric potential discrimination circuit 19, base drive circuit 18 is activated and MOSFET 17 changes to an ON state. Then, a small inverse voltage is applied to reflux diode 5x from low voltage direct current voltage source 8, and as an inverse electric current is supplied to reflux diode 5x with timing as shown in (a) of FIG. 8 immediately before matching MOSFET 4u is turned ON, an inverse recovery of influx diode 5x is produced by low voltage direct current voltage source 8 of inverse voltage applied circuit 7. Moreover, as the applied operation of the inverse voltage in terms of Y phase and Z phase is identical to the aforementioned X phase, an explanation has been omitted.

According to the aforementioned embodiments, when reflux diodes 5u~5w and 5x~5z interrupt an inverse voltage smaller than direct current voltage source 1 is applied to reflux diode 5u~5w and 5x~5z from inverse voltage applied circuit 7. As a result, as an inverse recovery in reflux diode 5u~5w and 5x~5z is produced not by direct current link voltage of direct current voltage source 1, but by low voltage direct current voltage source 8 of inverse voltage applied circuit 7, the loss produced at reflux diode 5u~5w and 5x~5z is reduced by over ⅕. For this reason, as the radiator (not illustrated) can be miniaturized, the entire device can also be miniaturized.

Also, the cost of the device has been reduced as MOSFET 17 with a low voltage resistance has been used to intervene on power source line 8 of inverse applied circuit 7 as the voltage applied to reflux diode 5u~5w and 5x~5z from low voltage direct current voltage source 8 is small.

Also, based on point A electric potential between MOSFET 4u and 4x, point B electric potential between MOSFET 4v and 4y and point C electric potential between MOSFET 4w and 4z, when phase electric current is flowing through MOSFET 4u~4w and 4x~4z a determination of which of reflux diodes 5u~5w and 5x~5z the phase electric current is flowing through can be made, and when flowing through a specified route of either of reflux diode 5u~5w or 5x~5z, an inverse voltage can be applied to that specified route. As a result, the disconnection of reflux diode 5u~5w and 5x~5z can be determined with certainty and with accurate timing an inverse voltage is able to be applied to reflux diode 5u~5w and 5x~5z.

Also, as MOSFET 4u~4w and 4x~4z is driven by low voltage direct current voltage source 8 of inverse applied circuit 7, it is not necessary to provide a dedicated drive power source for MOSFET 4u~4w and 4x~4z.

Also, capacitor 14 is charged by drive power source (=low voltage direct current voltage source 8) of MOSFET 4u~4w and 4x~4z and MOSFET 17 of inverse voltage applied circuit 7 is driven by the power source of capacitor 14. As a result, as the drive power source of MOSFET 4u~4w and 4x~4z and the drive power source of MOSFET 17 is shared by means of the charge pump method, it is not necessary to provide a dedicated drive power source for each of MOSFET 4u~4w and 4x~4z and MOSFET 17.

Figure 10:
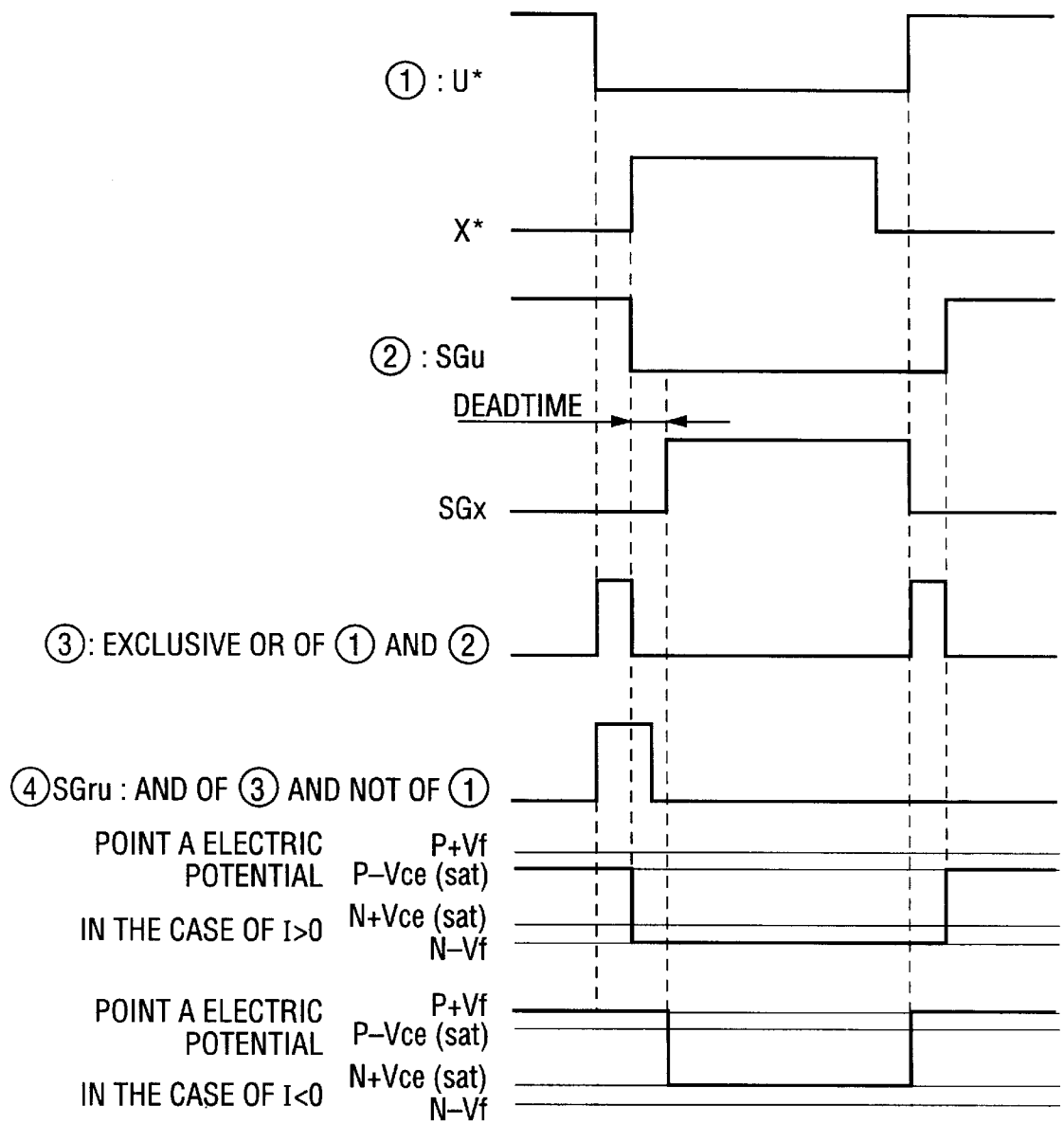
FIG. 10 is a U phase timing chart of a power conversion device in a second embodiment of the present invention.
Figure 11:
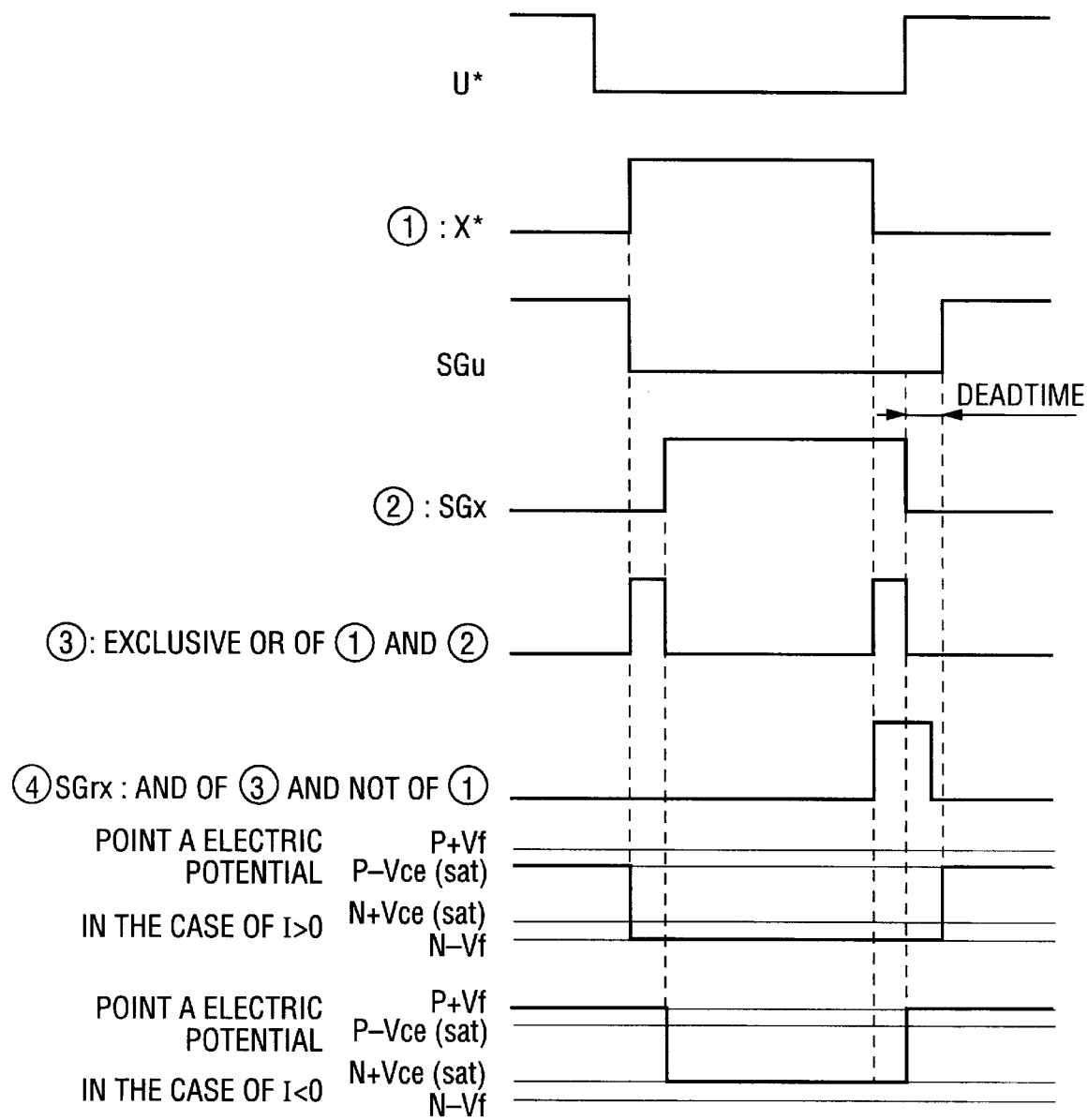
FIG. 11 is a diagram showing inverse voltage applied timing regarding an X phase reflux diode.

Moreover, in the aforementioned first embodiment, an inverse voltage was applied to reflux diode 5u~5w and 5x~5z immediately before MOSFET 4u~4w and 4x~4z was turned OFF, however, this is not confined to the above, for example as shown in FIG. 10 and ④ of FIG. 11 of the second embodiment of the present invention, an inverse voltage may be applied to reflux diode 5u~5w and 5x~5z accompanying the delay of the OFF timing of drive signal SGru~SGrw and SGrx~SGrz by a delay circuit (not illustrated), and continuing to within the dead time of MOSFET 4u~4w and 4x~4z.

Figure 12:
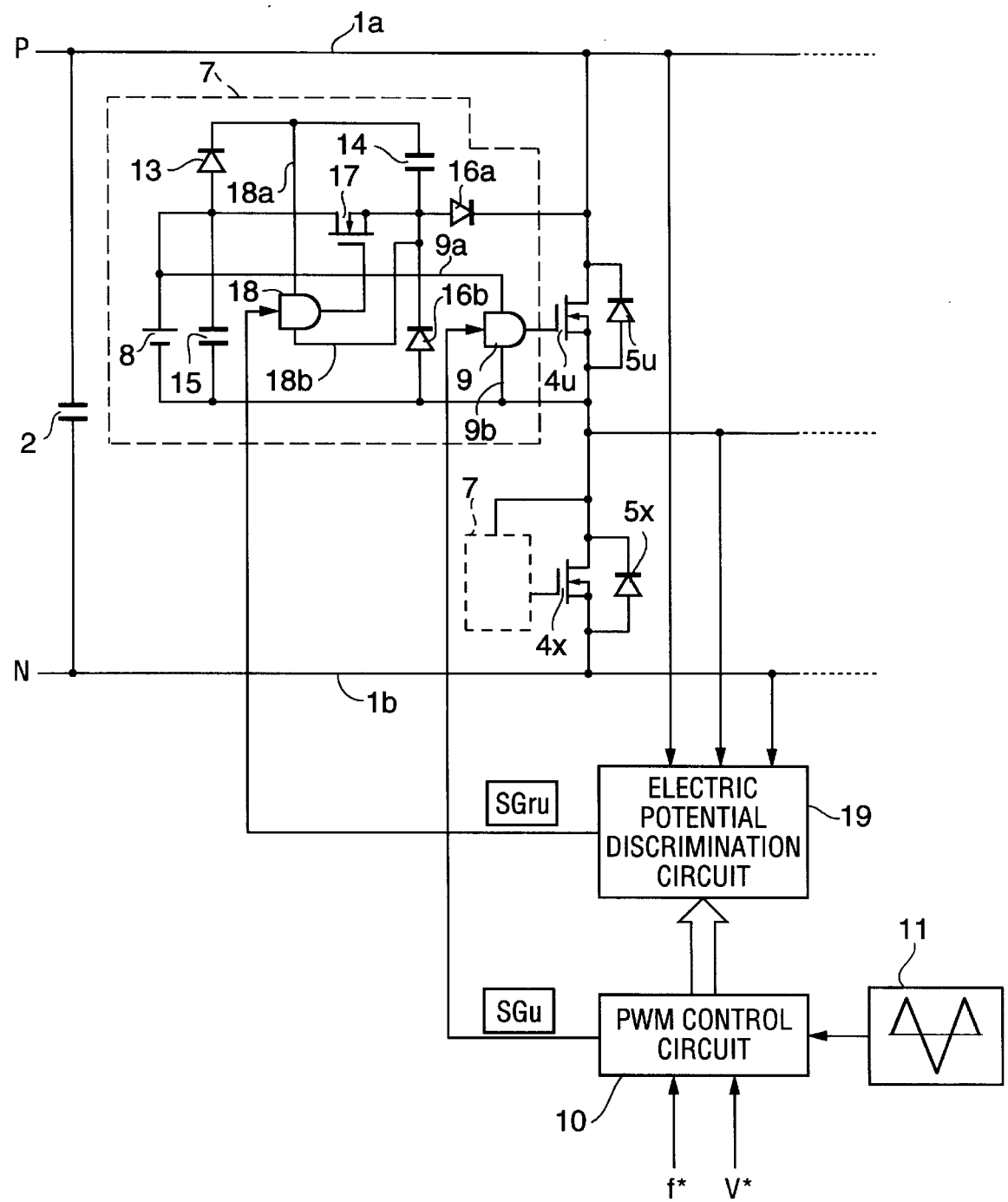
FIG. 12 is a diagram showing the power conversion device of a third embodiment (diagram showing U phase circuit construction)

Next, an explanation of the third embodiment of the present invention will be given based on FIG. 12 and FIG. 13. Moreover, the same code has been used for the same members in the said first embodiment and an explanation omitted, in the below, an explanation is only given for different members. Firstly, in FIG. 12, PWM control circuit 10 sets drive signal SGu~SGw and SGx~SGz of MOSFET 4u~4w and 4x~4z and outputs to base drive circuit 9. In this way switching of MOSFET 4u~4w and 4x~4z is controlled and a drive power source is supplied to load 6.

Figure 13:
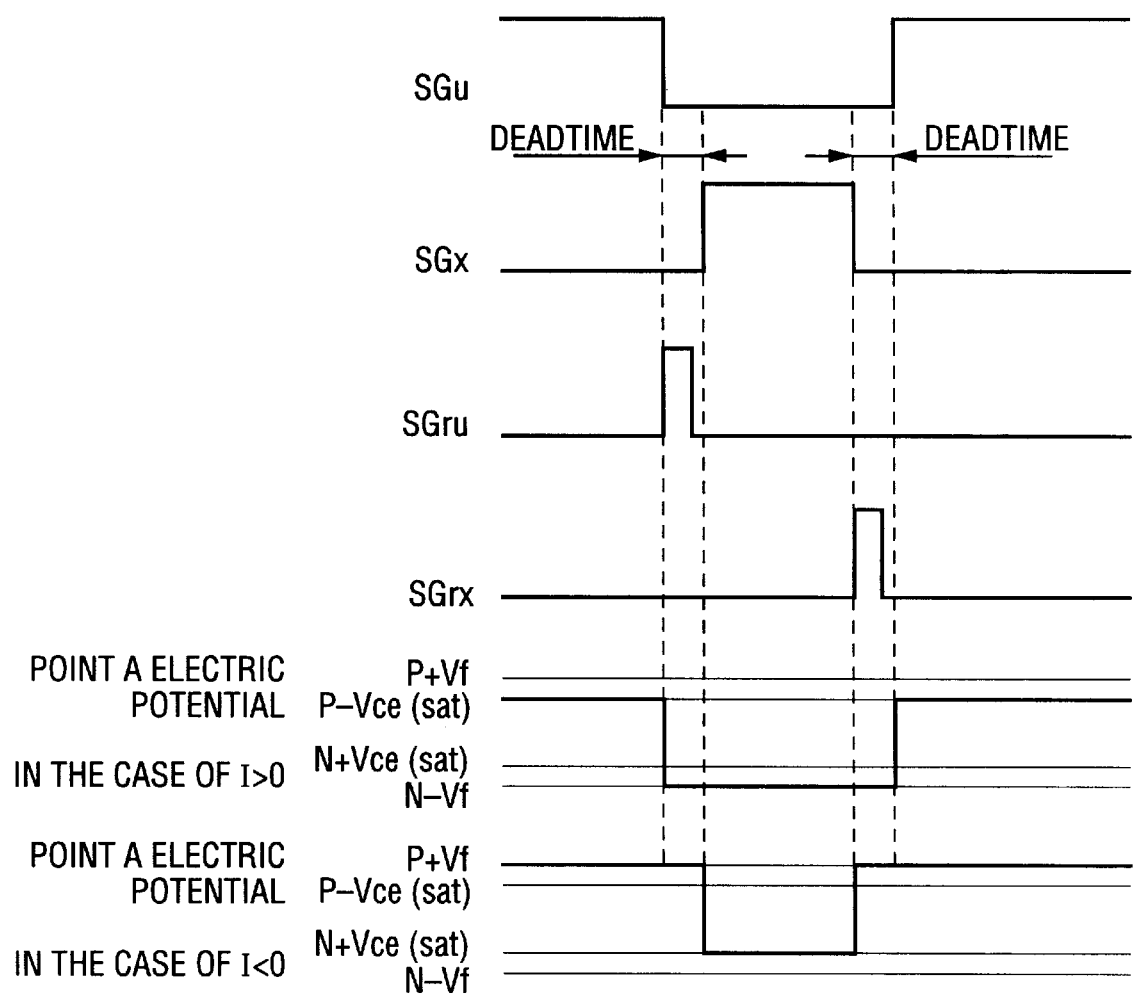
FIG. 13 is a U phase and X phase timing chart.

When PWM control circuit 10 sets drive signal SGu~SGw and SGx~SGz, as shown in FIG. 13, drive signal SGru~SGrw and SGrx~SGrz of MOSFET 17 is set and output to electric potential discrimination circuit 19. These drive signals SGru~SGrw and SGrx~SGrz are generated OFF time to drive signal SGu~SGw and SGx~SGz and the output time of drive signal SGu~SGw and SGx~SGz are set by the delay circuit of PWM control circuit 10 to "¾ of the dead time of MOSFET 4u~4w and 4x~4z.

Electric potential discrimination circuit 19 compares the electric potential of point A~point C with the reference value when drive signal SGu~SGw and SGx~SGz from PWM control circuit 10 is turned OFF, and as shown below, corresponding to the electric potential comparison results, selectively outputs drive signal SGru~SGrw and SGrx~SGrz to base drive circuit 18.

<The application of inverse voltage in terms of U phase reflux diode>

When drive signal SGu is OFF, MOSFET 4u is turned OFF by drive signal SGu. In this state, if the direction of the phase electric current is "I>0", as the electric current flows through reflux diode 5x electric potential Va on Point A becomes "Vn−Vf". In this case, electric potential discrimination circuit 19 compares point A electrical potential Va with reference electrical potential Vo and if "Va<Vo" decides that the direction of the phase electric current is "I>0" and does not output drive signal SGru. Moreover, reference electric potential Vo is set at "(Vp−Vn)/2".

When drive signal SGu is OFF, MOSFET 4u is turned OFF by drive signal SGu. In this state, if the direction of the phase electric current is "I<0", as the electric current flows through reflux diode 5u, point A electric potential becomes "Vp+Vf". In this case, electric potential discrimination circuit 19 compares A point electrical potential Va with reference electrical potential Vo, and if "Va>Vo", decides that the direction of the phase electrical current is "I<0", and accompanying the output of drive signal SGru to base drive circuit 18, applies a small inverse voltage to reflux diode 5u. Moreover, as the applied operation of the inverse voltage in terms of V phase and W phase is identical to the said U phase, an explanation has been omitted.

<The application of inverse voltage in terms of X phase reflux diode>

When drive signal SGx is OFF, MOSFET 4x is turned OFF by drive signal SGx. In this state, if the direction of the phase electrical current is "I>0", as the electrical current flows through reflux diode 5x, point A electrical potential Va becomes "Vn−Vf". In this case, electric potential discrimination circuit 19 compares point A electrical potential Va and reference electrical potential Vo, and if "Va<Vo", decides that the direction of the phase electrical current is "I>0" and accompanying the output of drive signal SGrx to base drive circuit 18 applies a small inverse voltage to reflux diode 5x.

When drive signal SGx is OFF, MOSFET 4x is turned OFF by drive signal SGx. In this state, if the direction of the phase electrical current is "I<0", as the electrical current flows through reflux diode 5u, point A electrical potential becomes "Vp+Vf". In this case, electric potential discrimination circuit 19 compares point A electrical potential Va with reference electrical potential Vo, and if "Va>Vo", decides that the direction of the phase electrical current is "I<0" and does not output drive signal SGrx. Moreover, as the applied operation of inverse electrical voltage in terms of Y phase and Z phase is the same as the aforementioned X phase, an explanation has been omitted.

According to the aforementioned embodiments, as an inverse electrical voltage is applied to reflux diode 5u~5w and 5x~5z during the dead time period of MOSFET 4u~4w and 4x~4z, the occurrence of harmful effects from the inverse voltage to MOSFET 4u~4w and 4x~4z is prevented.

Also, the point A electrical potential~point C electrical potential are detected on the OFF timing of drive signal SGu~SGw and SGx~SGz. For this reason, as the differential between electrical potential detection results "Vn−Vf" and "Vp+Vf" becomes large, errors occur when comparing electrical potential detection results "Vn−Vf" and "Vp+Vf" with reference electrical potential Vo, preventing the mistaken application of an inverse voltage to reflux diode 5u~5w and 5x~5z.

Moreover, in the aforementioned third embodiment, the output time of the drive signal SGru~SGrw and SGrx~SGrz is set to "¾" of the dead time period of MOSFET 4u~4w and 4x~4z, however, this is not confined to this, and may also be set to "½".

Figure 14:
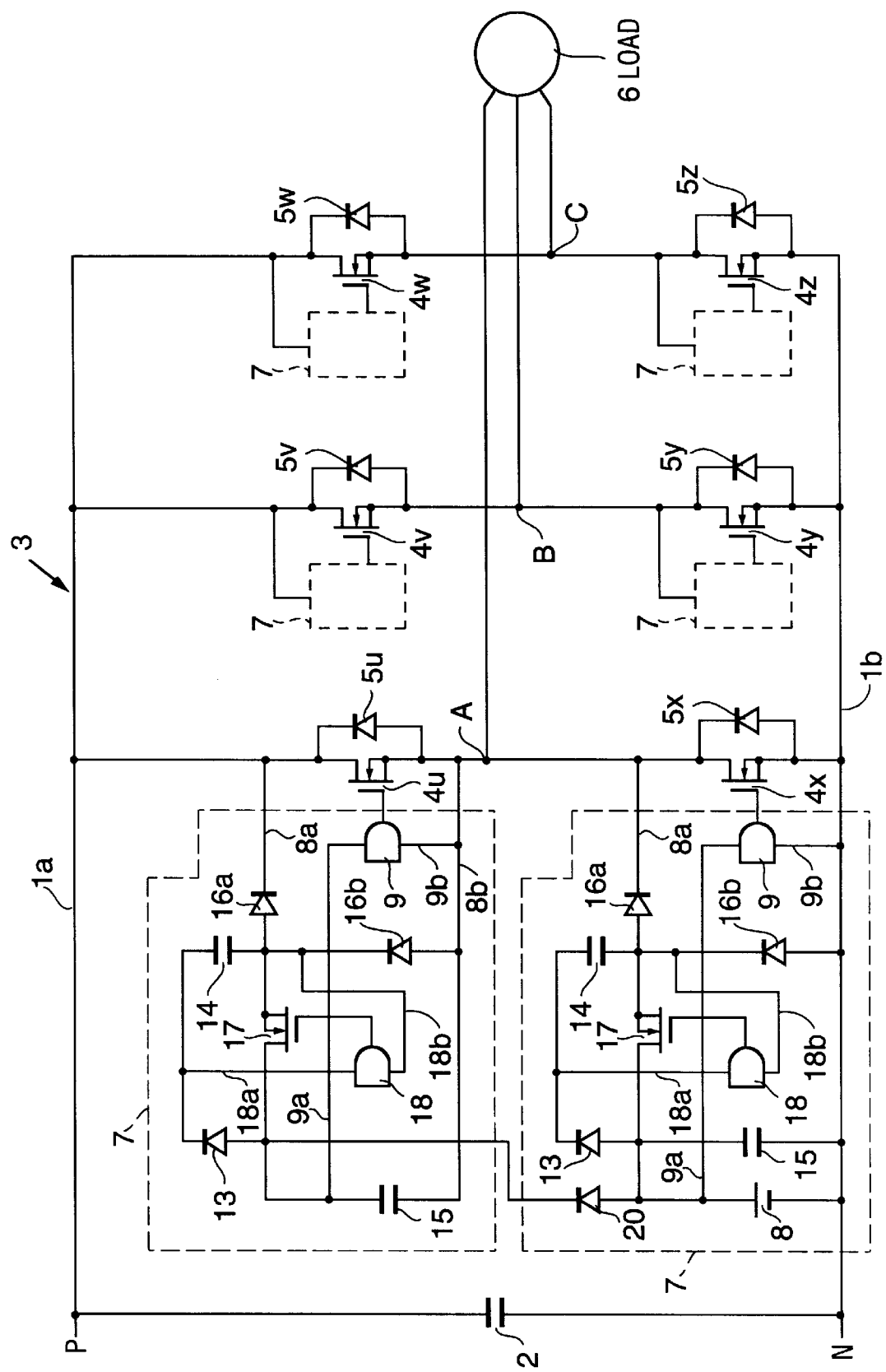
FIG. 14 is a diagram showing the overall circuit construction of a power conversion device in a fourth embodiment of the present invention.

Next, an explanation of the fourth embodiment of the present invention will be given based on FIG. 14. Moreover, the same code has been used for the same members in the aforementioned first embodiment, and an explanation omitted. In the below, an explanation is only given for different members. Power source line 8a of X phase inverse voltage applied circuit 7 down below is connected via diode 20 to power source line 8a of U phase inverse applied circuit 7 up above. Also, while not illustrated, power source line 8a of V phase inverse applied circuit 7, and power line 8a of Z phase inverse voltage applied circuit 7 is connected via diode 20 to power source line 8a of W phase inverse voltage applied circuit.

In the case of the above construction, for example, when MOSFET 4x is ON, as the electrical potential of power source line 1b is almost equal to point A electrical potential Va, capacitor 15 of U phase inverse voltage applied circuit 7 is able to charge up to voltage Er of low voltage direct current voltage source 8 of X phase inverse voltage applied circuit 7. Following this, when outputting drive signal SGu is output to base drive circuit 9 of U phase inverse applied circuit 7, a drive power source is provided from capacitor 15 to base drive circuit 9 and MOSFET 4u is tuned ON.

When MOSFET 4u is tuned ON, the minus terminal of capacitor 14 of U phase inverse voltage applied circuit 7 becomes the electrical potential of power source 1a and as the positive terminal of capacitor 14 becomes "electrical potential of power source line 1a+electrical voltage Er" a drive power source is provided from capacitor 15 via capacitor 14 to base drive circuit 18. Moreover, when MOSFET 4x is OFF, point A electrical potential Va becomes higher than the electrical potential of power source line 1b and diode 20 blocks discharge of capacitor 15. Also, concerning V phase and W phase, as this is the same for U phase, an explanation is omitted.

According to the aforementioned embodiment, as MOSFET 4u~4w and MOSFET 17 of U phase~W phase inverse voltage applied circuit 7 are driven by a common drive source (=capacitor 15), it is not necessary to provide a dedicated drive power source for U phase~W phase inverse voltage applied circuit 7.

Also, capacitor 14 is charged by the drive power source (capacitor 15) of MOSFET 4u~4w, and MOSFET 17 of inverse applied circuit 7 is driven by the power source of capacitor 14. For this reason, as the drive power source of MOSFET 17 is shared by means of the charge pump method, from this perspective also, it is not necessary to provide individual dedicated drive power sources.

Also, the voltage source (=capacitor 15) of U phase~W phase inverse voltage applied circuit 7 is charged by the voltage source (=low voltage direct current voltage source 8) of X phase~Z phase inverse voltage applied circuit 7. For this reason, as the voltage source of U phase~W phase inverse voltage applied circuit 7 and the voltage source of X phase~Z phase inverse voltage applied circuit 7 are shared by means of the charge pump method, it is not necessary to provide a dedicated voltage source to U phase~W phase inverse voltage applied circuit 7.

Figure 15:
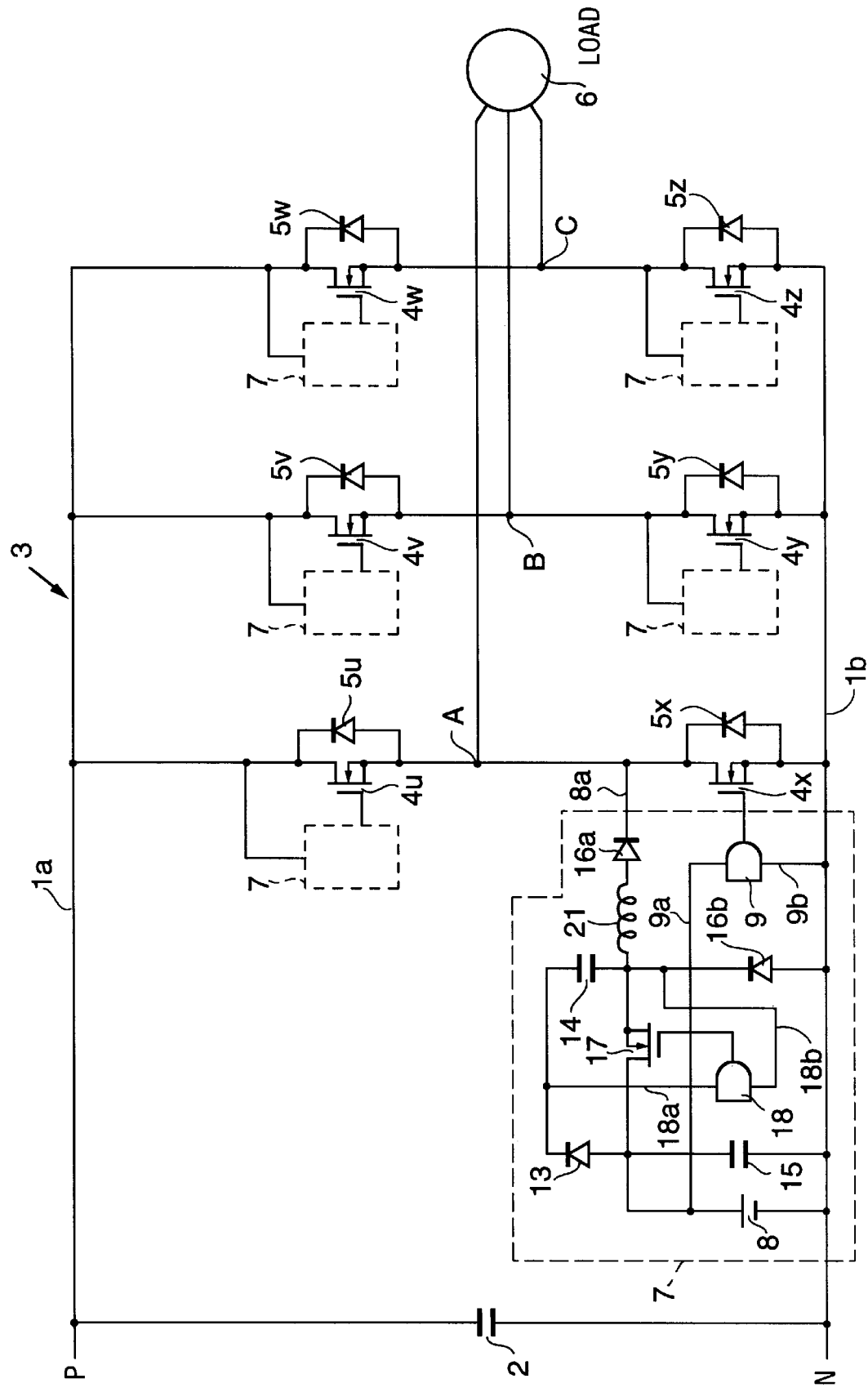
FIG. 15 is a diagram showing the overall circuit construction of a power conversion device in a fifth embodiment of the present invention.

Next, an explanation of the fifth embodiment of the present invention will be given based on FIG. 15. Moreover, the same code has been used for the same members in the aforementioned first embodiment and an explanation omitted, and in the below, an explanation is only given for different members. Reactor 21 intervenes on power line 8a of inverse voltage applied circuit 7.

In the aforementioned embodiment, as an even smaller inverse voltage is applied to reflux diode 5u~5w and 5x~5z through reactor 21, the loss occurring to reflux diode 5u~5w and 5x~5z during inverse recovery decreases even further. Because of this as the radiator can be miniaturized even further the entire device can be further miniaturized.

Figure 16:
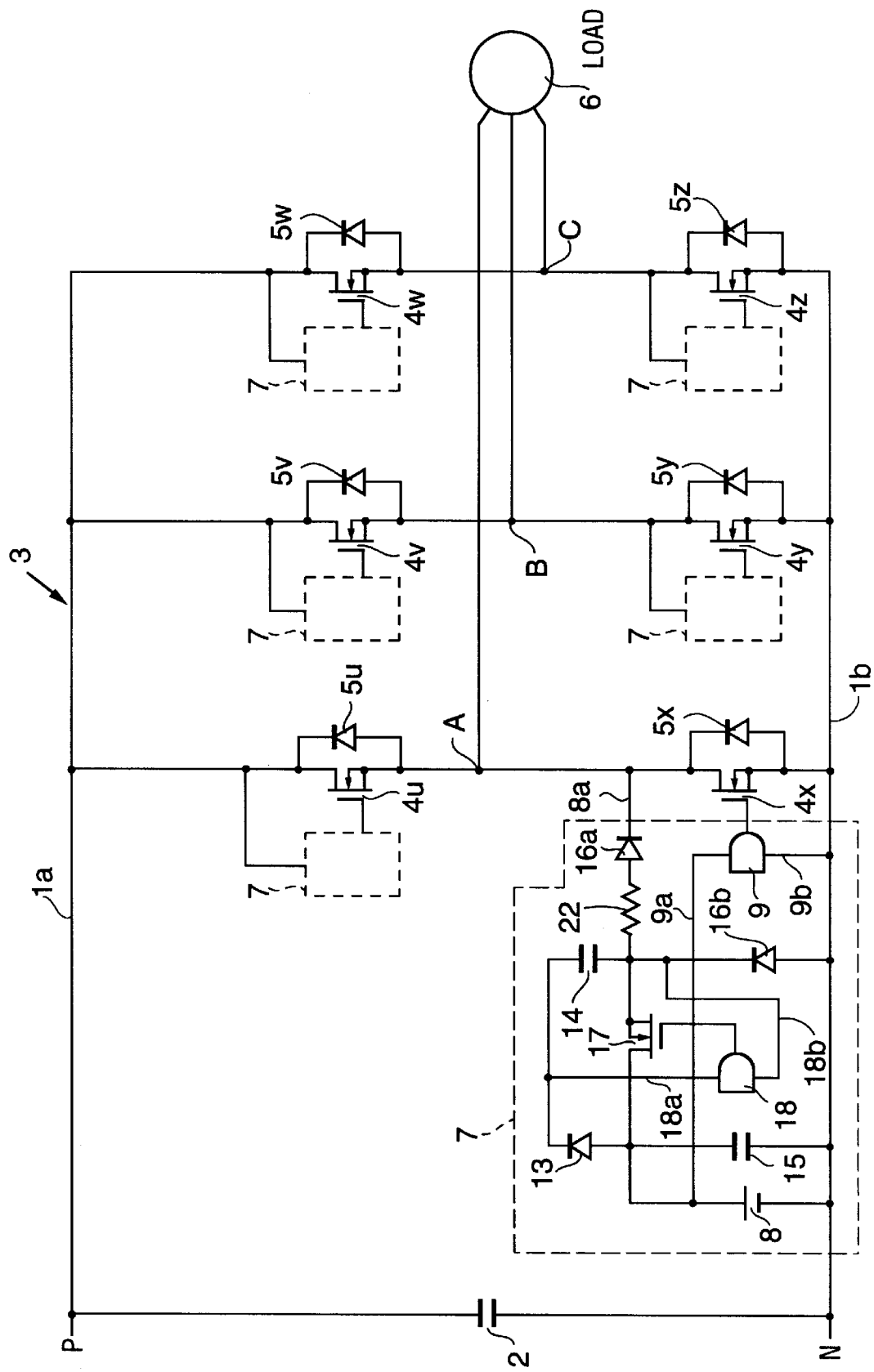
FIG. 16 is a diagram showing the overall circuit construction of a power conversion device in a sixth embodiment of the present invention.

Next, an explanation of the sixth embodiment of the present invention will be given based on FIG. 16. Moreover, the same code has been used for the same members in the aforementioned first embodiment and an explanation omitted, in the below, an explanation is only given for different members. Resistor 22 intervenes on power line 8a of inverse voltage applied circuit 7.

In the aforementioned embodiment, as an even smaller inverse voltage is applied to reflux diode 5u~5w and 5x~5z through resistor 22, the loss occurring to reflux diode 5u~5w and 5x~5z during inverse recovery decreases even further. Because of this as the radiator can be miniaturized even further the entire device can be further miniaturized.

Figure 17:
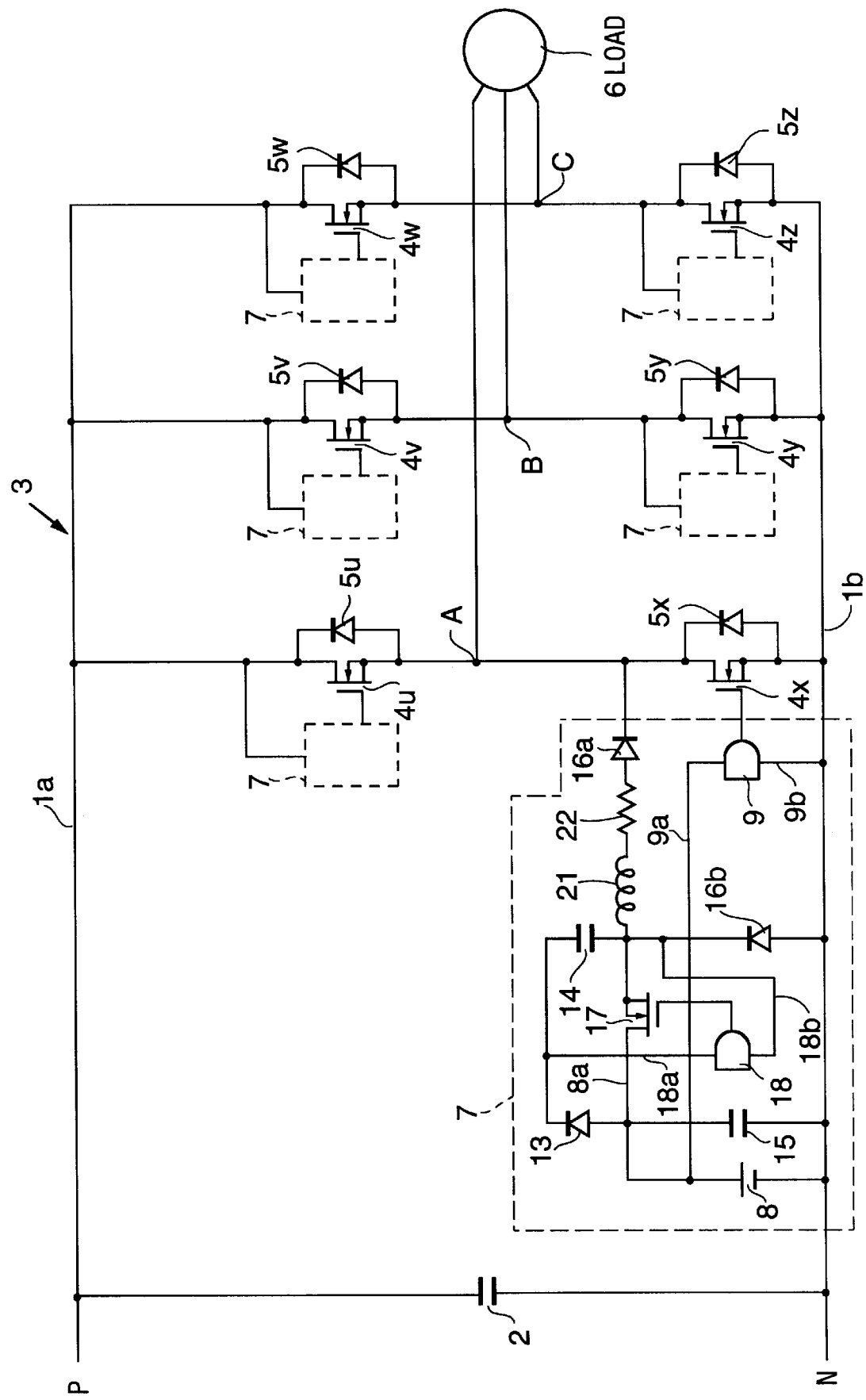
FIG. 17 is a diagram showing the overall circuit construction of a power conversion device in a seventh embodiment of the present invention.

Next, an explanation of the seventh embodiment of the present invention will be given based on FIG. 17. Moreover, the same code has been used for the same members in the aforementioned first embodiment and an explanation omitted, in the below, an explanation is only given for different members. Reactor 21 and resistor 22 intervene on power line 8a of inverse voltage applied circuit 7.

According to the aforementioned embodiment, as an even smaller inverse voltage is applied to reflux diode 5u~5w and 5x~5z through reactor 21 and resistor 22, the loss occurring to reflux diode 5u~5w and 5x~5z during inverse recovery decreases even further. Because of this as the radiator can be miniaturized even further the entire device can be further miniaturized.

Figure 18:
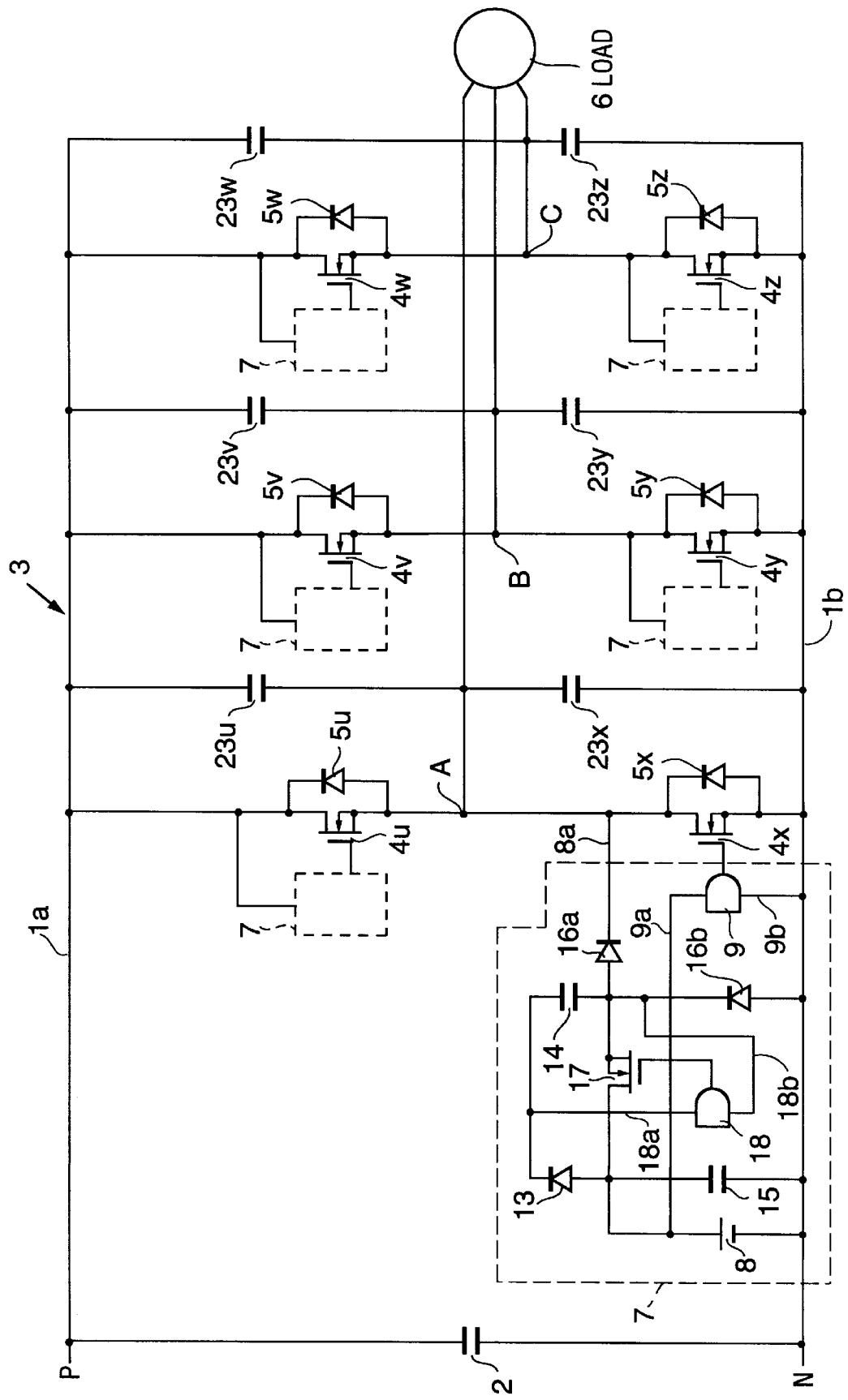
FIG. 18 is a diagram showing the overall circuit construction of a power conversion device in an eighth embodiment of the present invention.

Next, an explanation of the eighth embodiment of the present invention will be given based on FIG. 18. Moreover, the same code has been used for the same members in the aforementioned first embodiment and an explanation omitted, in the below, an explanation is only given for different members. Capacitor 23u~23w and 23x~23z are parallel connected to MOSFET 4u~4w and 4x~4z.

According to the aforementioned embodiment, for example, after inverse recovery is completed at reflux diode 5x capacitor 23x is charged by the excess energy. Then, as the electric potential of the positive side (point A side electric potential) of capacitor 23 becomes higher than the electric potential of power source 1b side, when MOSFET 4u is turned ON, the electric potential of point A side of MOSFET 4u becomes higher than the case of no capacitor 23x. For this reason, as dV/dt becomes smaller the instant MOSFET 4u is switching during inverse recovery, loss from electromagnetic noise (radiated electromagnetic wave noise), conduction noise, etc., is prevented. Furthermore, leakage current, and surge voltage in load 6, etc., are also prevented. Moreover, concerning capacitor 23u~23w and 23y~23z are the same as capacitor 23x, an explanation has been omitted.

Moreover, in the aforementioned first~eighth embodiments, MOSFET 4u~4w and 4x~4z are used as the main circuit switching components, MOSFET 17 is used as an inverse voltage applied switching component, however, this is not confined to the above, for example, semi conductors such as IGBT, GTO thyristor may also be used.

Also, in the said first~eight embodiments, the present invention was applied to an inverter device, however, this is not confined to the above, and for example, a reflux diode may be anti-parallel connected to a chopper device etc., or main current switching component.

As is clear from the above explanation, the power conversion device in the present invention produces the following effects. Namely, when the reflux diode disconnects, as a small inverse voltage is applied to the reflux diode, loss occurring in the reflux diode is reduced.

Also, according to the present invention, as a low voltage resistance inverse voltage applied switching component intervenes on the power source line of an inverse voltage applied circuit, the cost of the device is reduced.

Also, according to the present invention, as an inverse voltage is applied to the reflux diode during the dead time of both main circuit switching components, the occurrence of harmful effects from inverse voltage to the main current switching component is prevented.

Also, according to the present invention, in response to the electric potential between both main circuit switching components, inverse voltage is applied selectively. Therefore, disconnection of the reflux diode is determined with certainty and an inverse voltage can be applied to the reflux diode with accurate timing.

Also, according to the present invention, as the drive power source of the main circuit switching component and the power source of the inverse voltage applied circuit is shared, it is not necessary to provide a dedicated drive power source for the main circuit switching components.

Also, according to the said invention, as the drive power source of the inverse voltage applied switching component and the drive power source of the main circuit switching component are shared, it is not necessary to provide a dedicated drive power source for both switching components.

Also, according to the present invention, as a drive power source is provided by means of the charge pump method to the inverse voltage applied switching components from the drive power source of the main circuit switching component, it is not necessary to provide a dedicated drive power source for the inverse voltage applied switching component.

Also, according to the present invention, as the power source is provided by means of the charge pump method from the power source on one inverse voltage applied circuit to another inverse voltage applied circuit, it is not necessary to provide a dedicated power source for both inverse voltage applied circuits.

Also, according to the present invention, as at least one of a resistor or a reactor intervenes on the power line of the inverse voltage applied circuit, loss occurring at the reflux diode during inverse recovery is further reduced.

Also, according to the present invention, a capacitor is parallel connected the main circuit switching component. For this reason, as "dV/dt" becomes smaller when the main circuit switching component is switching, electromagnetic noise, etc., is prevented.

Obviously, numerous additional modifications and variations of the present invention are possible in light of the above teachings. It is therefore to be understood that within the scope of the appended claims, the invention may be practiced otherwise that as specially described herein.

What is claimed as new and desired to be secured by Letters Patent of the United States is:

1. A power conversion device comprising:
    a pair of main circuit switching components supplying power to a load, connected in series to a direct current voltage source;
    a reflux diode anti-parallel connected to each of said main circuit switching components; and
    an inverse voltage applied circuit connected to each of said reflux diodes for applying an inverse voltage to each of said reflux diodes when each of said diodes disconnects.

2. The power conversion device according to claim 1, further comprising:
    an inverse voltage applied switching component with a voltage resistance lower than said main circuit switching component, intervening on a power line of said inverse voltage applied circuit.

3. The power conversion device according to claim 1, wherein:
    said inverse voltage applied circuit applies an inverse voltage to said reflux diode during a dead time of both said main circuit switching components.

4. The power conversion device according to claim 1, further comprising:
    an electric potential detection means for detecting an electric potential between both said main circuit switching components, said inverse voltage applied circuit selectively applying an inverse voltage in response to detection results of said electric potential detection means.

5. The power conversion device according to claim 1, wherein:

each main circuit switching component and its associated inverse voltage applied circuit share a power source.

6. The power conversion device according to claim 1, further comprising:

an inverse voltage switching component intervening on a power line of said inverse voltage applied circuit; and wherein a drive power source of said inverse voltage applied switching component is shared by said direct current voltage source of said main circuit switching component.

7. The power conversion device according to claim 1, further comprising:

an inverse voltage switching component intervening on a power line of said inverse voltage applied circuit; and wherein a drive power source of said inverse voltage applied switching component is applied from said direct current voltage source of said main circuit switching component by a charge pump.

8. The power conversion device according to claim 1, wherein:

a power source of one of said inverse voltage applied circuits is applied from a power source of the other said inverse voltage applied power circuit by a charge pump.

9. The power conversion device according to claim 1, wherein:

at least one of either a resistor or a reactor intervenes in power source lines of said inverse voltage applied circuits.

10. The power conversion device according to claim 1, further comprising:

a capacitor connected in parallel to each main circuit switching component.

* * * * *